(12) United States Patent
Marivo et al.

(10) Patent No.: US 11,713,785 B2
(45) Date of Patent: Aug. 1, 2023

(54) HUB BEARING ASSEMBLY FOR DISCS FOR SOIL CULTIVATION

(71) Applicant: Aktiebolaget SKF, Gothenburg (SE)

(72) Inventors: Massimo Marivo, Airasca (IT); Stefano Urso, Bologna (IT); Riccardo Venturucci, Turin (IT)

(73) Assignee: AKTIEBOLAGET SKF

( * ) Notice: Subject to any disclaimer, the term of this patent is extended or adjusted under 35 U.S.C. 154(b) by 7 days.

(21) Appl. No.: 17/245,687

(22) Filed: Apr. 30, 2021

(65) Prior Publication Data

US 2021/0348646 A1 Nov. 11, 2021

(30) Foreign Application Priority Data

May 6, 2020 (IT) .................. 102020000009991

(51) Int. Cl.
*F16C 33/78* (2006.01)
*F16C 19/18* (2006.01)
*A01B 71/04* (2006.01)

(52) U.S. Cl.
CPC .......... *F16C 33/7896* (2013.01); *A01B 71/04* (2013.01); *F16C 19/185* (2013.01); *F16C 33/7823* (2013.01); *F16C 33/7883* (2013.01); *F16C 33/7886* (2013.01); *F16C 2310/00* (2013.01)

(58) Field of Classification Search
CPC ............... F16C 19/185; F16C 33/7823; F16C 33/7883; F16C 33/7886; F16C 33/7896; F16C 33/805; F16C 2310/00; A01B 71/04
See application file for complete search history.

(56) References Cited

U.S. PATENT DOCUMENTS

2010/0025057 A1\* 2/2010 Andersson ............ F16C 19/184
  384/544
2015/0316103 A1\* 11/2015 Inoue .................. F16C 33/7896
  384/484

FOREIGN PATENT DOCUMENTS

| DE | 3811443 A | * 10/1989 | ............. A01B 71/04 |
| DE | 102012208011 A1 | * 11/2013 | ............. F16C 19/543 |
| DE | 102013219118 | 3/2015 | |
| DE | 102013219118 A1 | * 3/2015 | ............. A01B 71/04 |
| EP | 2088846 | 10/2016 | |

(Continued)

OTHER PUBLICATIONS

Machine Translation of DE-102012208011-A1 (Year: 2013).*

(Continued)

*Primary Examiner* — Alan B Waits
(74) *Attorney, Agent, or Firm* — Reed Smith LLP

(57) ABSTRACT

A hub bearing assembly for the rotatable mounting of a soil cultivating disc (D) on a support shaft (A) of an agricultural machine, the assembly being provided with a hub bearing unit which in turn is provided with a flanged outer ring carrying two integral outer raceways for respective rows of rolling bodies, a flange fixed to the flanged outer ring for mounting a disc (D), and, for each outer raceway, an inner ring axially adjacent to the other inner ring, both of which can be engaged by the support shaft (A); and a sealing device mounted on a side of the hub bearing assembly opposite the side of the flange, composed of a first sealing stage and a second sealing stage arranged sequentially along the support shaft (A) and housed in respective seats formed directly in the flanged outer ring.

5 Claims, 2 Drawing Sheets

(56) References Cited

FOREIGN PATENT DOCUMENTS

| | | | |
|---|---|---|---|
| EP | 3292746 A1 * | 3/2018 | ............. A01B 71/04 |
| WO | 20040065806 | 8/2004 | |
| WO | 2007105185 | 9/2007 | |

OTHER PUBLICATIONS

Machine Translation of DE-102013219118-A1 (Year: 2015).*
Search Report for corresponding Italy Patent Application No. 202000009991 dated Dec. 22, 2020.

* cited by examiner

HUB BEARING ASSEMBLY FOR DISCS FOR SOIL CULTIVATION

CROSS-REFERENCE RELATED APPLICATIONS

This application is based on and claims priority to Italian Patent Application No. 102020000009991 filed on May 6, 2020, under 35 U.S.C. § 119, the disclosure of which is incorporated by reference herein.

FIELD

The present disclosure relates to hub bearing assemblies for discs for soil cultivation.

BACKGROUND

Discs for soil cultivation are usually distributed along a front of the agricultural machine on corresponding supporting shafts projecting from the frame of the agricultural machine, and each disc is typically mounted rotatably with respect to the supporting shaft by means of a hub bearing assembly composed, as illustrated in European Patent EP 2 088 846 B2 for example, of a hub bearing unit which may include a flanged outer ring carrying two integral raceways for respective rows of rolling bodies, a flange fixed to the flanged outer ring for mounting a disc, and a sealing device mounted on one side of the hub bearing assembly opposite the flange side in order to prevent contaminants (water, mud, soil) from entering the hub bearing unit from the side opposite that on which the disc is mounted, that is to say from the side facing an arm of the frame of the agricultural machine.

BRIEF DESCRIPTION OF THE DRAWINGS

Embodiments in accordance with the disclosure will now be described with reference to the attached drawings, which show non-limiting examples, in which.

DETAILED DESCRIPTION

Some applications of hub bearing assemblies disclosed herein require that the size of an outer ring and a flange may become considerable, and the same will apply not only to the size of the corresponding sealing device but also, and especially, to its sealing capacity; consequently its manufacture and the guarantee of an efficient seal for a sufficient length of time become critical. The object of the present disclosure is to provide a hub bearing assembly for discs for soil cultivation, which is not only highly reliable, but may also be used in particularly severe operating conditions while the sealing action against external contaminants is ensured. Thus, according to the present disclosure, a hub bearing assembly for discs for soil cultivation is provided.

Figure 1:
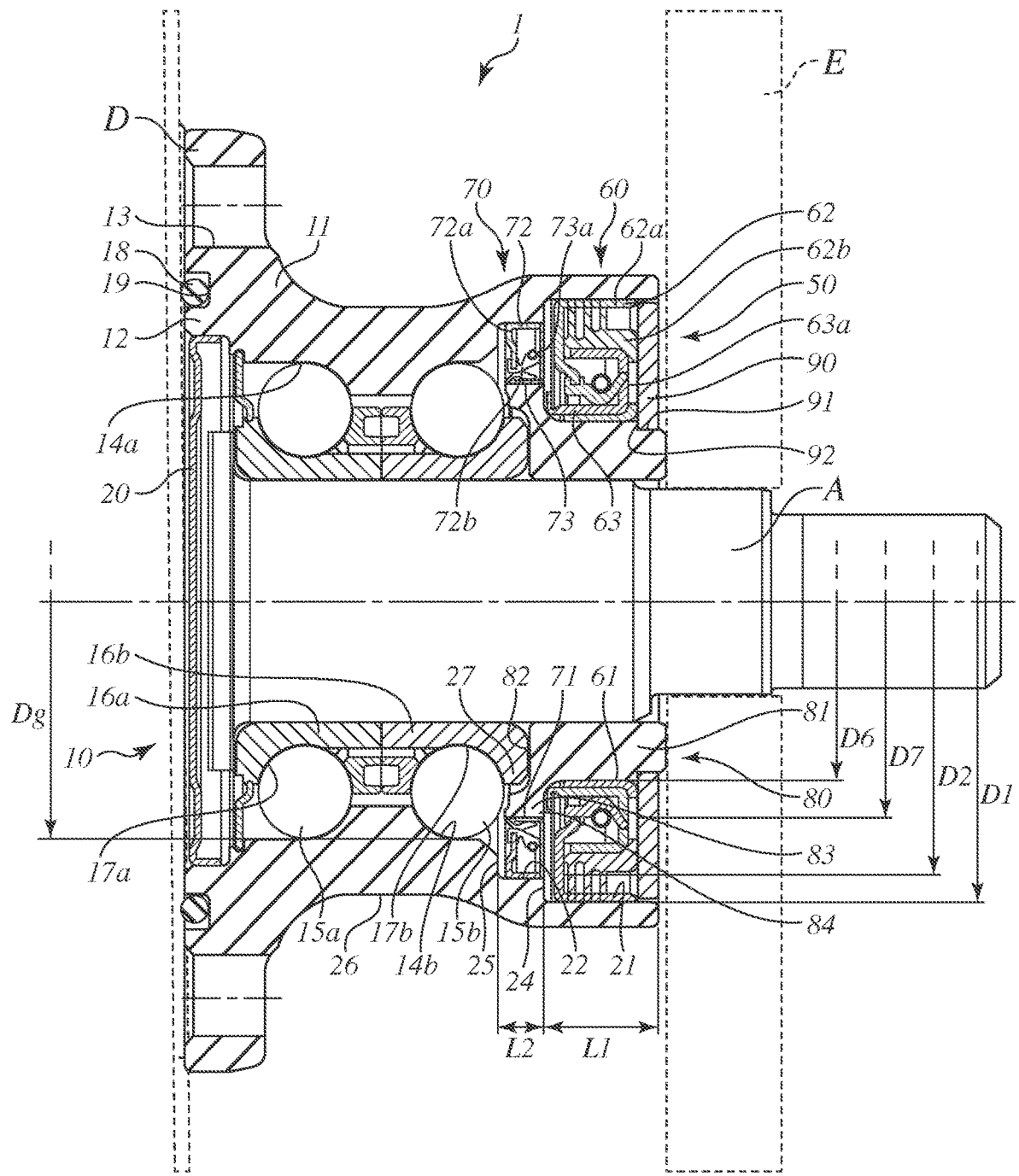
FIG. 1 is a view in side elevation of an exemplary embodiment of a hub bearing assembly in accordance with the disclosure, which may be used to rotatably support a soil cultivating disc on a shaft projecting from an arm of an agricultural machine.

With reference to FIG. 1, the number 1 indicates the whole of a first preferred embodiment of a hub bearing assembly for a soil cultivating disc D, comprising a hub bearing unit, indicated as a whole by 10, and a sealing device 50 associated with the hub bearing unit 10. In exemplary embodiments, the hub bearing unit 10 may include a flanged outer ring 11, a radial flange 12, fixed to the flanged outer ring 11, for mounting the disc D by means of bolts (not shown) mounted in a series of axial holes 13. Two raceways 14a, 14b may be formed internally in the flanged outer ring 11, for housing respective rows of rolling bodies 15a, 15b; and for each such raceway 14a, 14b, a respective inner ring 16a, 16b axially adjacent to the other inner ring 16b, 16a, both of which are mounted on a central supporting shaft A projecting from an arm E of the frame of an agricultural machine.

Exemplary rings 16a, 16b are provided with two respective raceways 17a, 17b for housing the rows of rolling bodies 15a, 15b.

On the side facing the disc D, a hub bearing unit 10 comprises an O-ring seal 18 housed in a circular groove 19 and pressed between the outer ring 11 and the disc D to ensure the sealing action against contaminants that might access the inner parts of the hub bearing unit 10, and a plug 20, radially inside the circular groove 19, for closing the outer ring 11 on the side of the disc D.

On the side opposite that which faces the disc D, the hub bearing unit 10 comprises two cylindrical seats 21 and 22, which are formed directly in the flanged outer ring 11, and are positioned in series with one another. The seat 21 has a first internal mounting diameter D1 and a first axial length L1, the sizes of both of which are greater than the sizes of an internal mounting diameter D2 and of a second axial length L2, respectively, of the seat 22, which therefore has a smaller overall size than the size of the seat 21. Additionally, the seat 21 is separated from the seat 22 by a shoulder 24 formed by the difference in size between the diameters D1 and D2, while the seat 22 is separated from the adjacent raceway 14b by a further shoulder 25, since the raceways 14a and 14b have respective groove bottom diameters Dg of smaller size than the size of the diameter D2.

Because of the progressive reduction of the sizes of the diameters D1, D2 and Dg as described above, the outer ring 11 may have, in a position radially opposed to the two raceways 14a, 14b which are formed directly inside the flanged outer ring 11, an outer portion 26, which is located in axially intermediate position between the flange 12 and the sealing device 50, and is radially recessed so as to act as a preferential seat for winding the metal wires picked up from the ground during the use of the agricultural machine. These metal wires are used for binding bundles of hay or straw, and for other agricultural uses, and, since they are commonly left on the ground, will inevitably be picked up by discs and wound tightly round the hubs, forming rather thick coils. These wires, by becoming tangled around and adjacent to the hub bearing assembly 1, may destabilize or displace part of this assembly, and are therefore wound in an area spaced apart from the sealing device 50, so as not to have a detrimental effect on the correct operation of the latter. In other words, a channel, defined by outer portion 26, opening in an outward radial direction, is formed around the flanged outer ring 11, into which channel the aforesaid metal wires are guided and wound. The outer portion 26 also shapes the flanged outer ring 11 so as to improve its penetration into the soil together with the disc D, thus facilitating the operation of the disc D with a considerable saving of energy, in other words a saving of fuel, for the agricultural machine, relative to known devices.

To ensure that there is a sealing action against contaminants that might enter the inner parts of the hub bearing unit 10 axially on the opposite side of the plug 20, or of the disc D, the sealing device 50 is mounted on a side of the hub bearing assembly 10 opposite the side of the flange 12 and comprises a first sealing stage 60 and a second sealing stage 70 placed sequentially along the support shaft A and housed, respectively, in the seat 21 behind the shoulder 24 and in the seat 22 behind the shoulder 25. For the purposes of the positioning and the optimal design of the two sealing stages 60 and 70 inside the flanged outer ring 11, the sealing device 50 further comprises an intermediate support ring 80 radially interposed between the support shaft A and the first sealing stage 60 and the second sealing stage 70, by both of which it is shared.

The intermediate support ring 80 is placed axially behind the inner ring 16b, and comprises two mounting surfaces 61 and 71, the mounting surface 61 of stage 60 having a mounting diameter D6 of smaller size than the size of a mounting diameter D7 of the mounting surface 71 of stage 70. The mounting surfaces 61 and 71 are axially aligned with each other and axially superimposed on the cylindrical seats 21 and 22 respectively, to house between them the sealing stage 60 and 70 respectively.

In particular, again as illustrated in FIG. 1, the intermediate ring 80 comprises: a main tubular body 81, which is mounted on the support shaft A, is radially delimited towards the outside by the surfaces 61, and is positioned to bear axially against the ring 16b with its annular bearing surface 82; and a lateral annular appendage 83 which extends from the tubular body 81 beyond the surface 82 to be superimposed axially on a radial shoulder 27 of the ring 14b, and which is radially delimited towards the outside by the surface 71. The appendage 83 also forms a shoulder 84, which is defined by the difference in size between the diameters D6 and D7, and is axially aligned with the shoulder 24.

In order to provide further protection for the sealing stages 60 and 70, and, evidently, for the hub bearing unit itself, the sealing device 50 finally comprises a lateral shield 90 mounted on the support ring 80, on a mounting surface 91 which is formed through the surface 61 and has a mounting diameter D9 of smaller size than the size of the diameter D6 of the surface 61, so as to form a further shoulder 92. The lateral shield 90, in the form of an annular disc, extends radially outwards from the surface 91, substantially as far as the seat 21, thus sealing the outer ring 11 on the side opposite the side of the disc D, and is axially locked behind the shoulder 92 to prevent its accidental movement against the sealing stages 60 and 70.

As regards the sealing device 50, the configuration of the seats 21 and 22 and the possibility of designing the intermediate support ring 80 on an ad hoc basis make it possible to select in an optimal manner the type of sealing stages 60 and 70, in accordance with both the overall sizes of the hub bearing assembly 1 and the application of the hub bearing assembly 1, and, in the preferred example of embodiment of the present invention, the stage 60 is formed by a cassette seal for heavy-duty grease lubricated applications and is used in severe environmental conditions of operation, while the stage 70 is preferably formed by a radial seal for shafts, having a smaller overall size than the size of the stage 60.

Each sealing stage 60 and 70 comprises a rotatable part 62, 72, fixed to the outer ring 11 in the corresponding seat 21 and 22, and a fixed part 63, 73 mounted on the intermediate ring 8; and each of the rotatable parts 62, 72 and the fixed parts 63, 73 is provided with a respective shield 62a, 72a, 63a, 73a, and at least the rotatable parts 62, 72 carry a respective seal 62b, 72b of elastic material with at least one sealing lip: the number and configuration of the sealing lips may vary according to the application of the hub bearing assembly 1.

Figure 2:
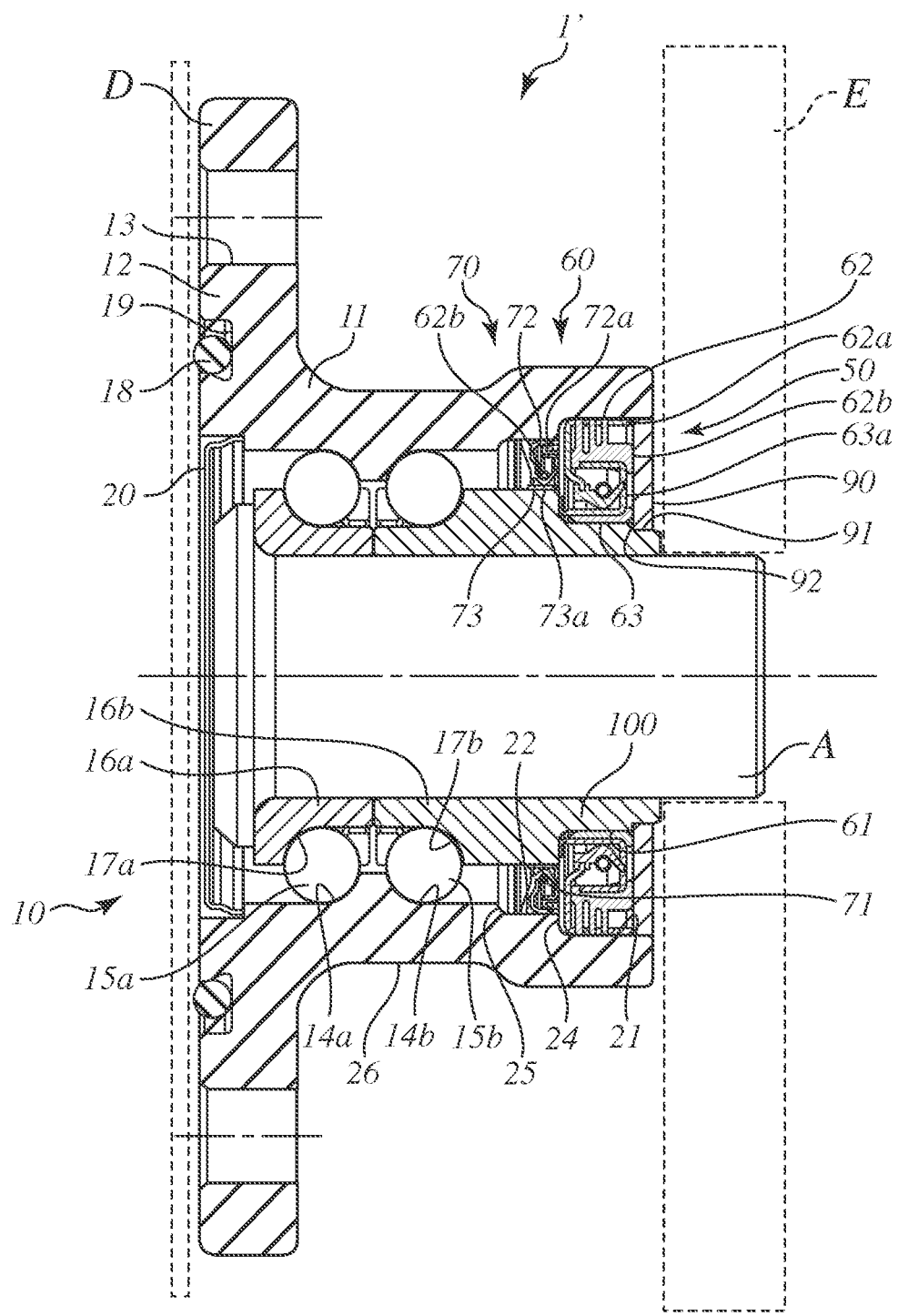
FIG. 2 is a view in side elevation of another exemplary embodiment of the hub bearing assembly of FIG. 1.

The alternative embodiment of the hub bearing assembly 1 described herein and illustrated in FIG. 2 relates to a hub bearing assembly 1' which differs from the hub bearing assembly 1 in that, in order to provide an axial extension which is greater than the axial extension of the hub bearing unit 10 described above, while keeping the sealing device 50 unchanged in respect of its main innovative characteristics, the inner ring 16b and the intermediate ring 8 are integral with each other, forming a single body 100, in which the shoulder 27 and the annular lateral appendage 83 are entirely integrated with each other, and into which, above all, the raceway 17b is also directly integrated.

The single body 100 has an axial length greater than the sum of the axial lengths of the inner ring 16b and the intermediate ring 8, and enables the overall axial length of the hub bearing assembly 1' to be increased while keeping the overall rigidity substantially unchanged.

In the alternative hub bearing assembly 1' that has been described, the outer ring 11 also has a greater axial length, and the elongation may be absorbed either by the outer portion 26 or by one or both of the seats 21 and 22.

The disclosure is not intended to be limited to the embodiments described and illustrated herein, which are to be considered as examples of assembly; rather, the embodiments may be modified in respect of the shape and arrangements of the parts, and in respect of the constructional and functional details, as will be evident to those skilled in the art. Thus, there are many equivalents to a means for bearing a hub, e.g., 10, that includes a means for sealing, e.g., sealing device 50, and a raceway means, e.g., flanged outer ring 11.

The invention claimed is:

1. A hub bearing assembly configured for the rotatable mounting of a soil cultivating disc on a support shaft of an agricultural machine, the assembly comprising:

a hub bearing unit comprising an outer ring carrying two integral outer raceways for respective rows of rolling bodies, a flange fixed to the outer ring configured for mounting the disc, and, for each outer raceway, an inner ring axially adjacent to the other inner ring, both of which are configured to be engaged by the support shaft; and a sealing device mounted on a side of the hub bearing assembly opposite the side of the flange, wherein the sealing device comprises:

a first sealing stage and a second sealing stage arranged sequentially along the support shaft and housed in respective seats formed directly in the outer ring;

wherein the sealing device comprises an intermediate support ring radially configured to be interposed between the support shaft and the first sealing stage and the second sealing stage, wherein each sealing stage comprises a rotatable part, fixed to the outer ring in the corresponding seat, and a fixed part mounted on the intermediate ring; each of said parts comprising a shield, and at least said rotatable parts carrying a respective seal of elastic material with at least one respective sealing lip;

wherein the intermediate support ring comprises, for each sealing stage, a respective mounting diameter, a first mounting diameter of the first sealing stage having a smaller size than the size of a second mounting diameter of the second sealing stage;

wherein the intermediate support ring comprises a lateral shield for protecting the first sealing stage and the second sealing stage, mounted on the intermediate support ring on a third mounting diameter having a smaller size than the size of the first mounting diameter of the first sealing stage.

2. The hub bearing assembly of claim 1, wherein the lateral shield is an annular disc.

3. The hub bearing assembly of claim 1, wherein the intermediate support ring is placed axially behind an inner ring of the pair of axially adjacent inner rings.

4. The hub bearing assembly of claim 1, wherein the intermediate support ring and the inner ring are unitary with each other, forming a single body.

5. The hub bearing assembly of claim 1, wherein the outer ring comprises an outer portion intermediate to the flange and on the side of the sealing device, the outer portion comprising a recess open in the radial direction comprising a diameter less than a diameter of a portion of the outer ring axially aligned with the sealing device, wherein the recess is configured as a preferential seat for winding wires picked up from the ground during the use of the agricultural machine.

* * * * *